United States Patent [19]

Gilkey et al.

[11] 3,959,213

[45] May 25, 1976

[54] BASIC DYEABLE POLYESTER FIBER

[75] Inventors: Russell Gilkey; Thomas H. Wicker, Jr., both of Kingsport, Tenn.

[73] Assignee: Eastman Kodak Company, Rochester, N.Y.

[22] Filed: June 4, 1975

[21] Appl. No.: 583,950

Related U.S. Application Data

[63] Continuation-in-part of Ser. No. 501,516, Aug. 29, 1974, abandoned, which is a continuation-in-part of Ser. No. 468,313, May 9, 1974, abandoned.

[52] U.S. Cl. .............. 260/45.7 P; 8/165; 8/179; 8/DIG. 4; 260/45.95 L; 260/75 S; 260/75 P

[51] Int. Cl.² ............. C08G 63/12; C08L 67/02; D06P 3/52

[58] Field of Search .......... 260/45.7 P, 45.95, 75 S, 260/75 P

[56] References Cited
UNITED STATES PATENTS

| | | | |
|---|---|---|---|
| 3,018,272 | 1/1962 | Griffing et al. | 260/75 P |
| 3,412,070 | 11/1968 | Jakob et al. | 260/75 P |
| 3,445,504 | 5/1969 | Mehalso | 260/75 P |
| 3,446,763 | 5/1969 | Okuzumi | 260/75 P |
| 3,488,298 | 1/1970 | Barkey et al. | 260/77 |
| 3,546,180 | 12/1970 | Caldwell et al. | 260/33.4 |
| 3,651,017 | 3/1972 | Tanabe et al. | 260/75 P |
| 3,669,925 | 6/1972 | King et al. | 260/45.95 |
| 3,692,867 | 9/1972 | Mayer et al. | 260/45.7 P |
| 3,725,351 | 4/1973 | Harrison et al. | 260/33.4 |
| 3,773,715 | 11/1973 | Largman et al. | 260/45.7 P |
| 3,784,507 | 1/1974 | Braunstein | 260/45.7 P |

*Primary Examiner*—Ronald W. Griffin
*Attorney, Agent, or Firm*—Charles R. Martin; Daniel B. Reece III

[57] ABSTRACT

Disclosed is a textile fiber comprised of an isophthalic acid modified poly(1,4-cyclohexylenedimethylene terephthalate) type basic dyeable polyester. The fiber exhibits a desirable overall balance of properties and an unobvious combination of high basic dye takeup and low disperse dye take-up.

3 Claims, No Drawings

BASIC DYEABLE POLYESTER FIBER

This application is a continuation-in-part of our copending application, Ser. No. 501,516, filed Aug. 29, 1974, entitled "Basic Dyeable Polyester Fiber", now abandoned, which was a continuation-in-part of Ser. No. 468,313, filed May 9, 1974, entitled "Basic Dyeable Polyester Fiber", now abandoned.

This invention relates to a basic dyeable carpet fiber that exhibits a desirable overall balance of properties and an unobvious combination of high basic dye takeup and low disperse dye takeup.

Multicolored carpets have gained wide acceptance in recent years because of their aesthetic qualities. Because of economic considerations, the multicolor character of the carpet must be achieved by contacting the greige carpet with a plurality of dyes in one dyeing operation. Thus, if one desires to prepare a carpet of three colors, then three different types of synthetic carpet fibers can be used to prepare a greige carpet and the greige carpet is dyed to three different colors in one dyeing operation.

Polyester fibers have gained wide acceptance for preparation of three-color carpets. When preparing a three-color carpet of polyester fibers, typically the carpet is formed from a first fiber that dyes to a light shade of a first color, a second fiber that dyes to a dark shade of the first color, and a third fiber that dyes to a second color complementary to the first color. A dyebath containing a disperse dye, such as an orange dye, and a basic dye, such as a brown dye, is prepared. When the greige carpet is dyed in this dyebath a three-color carpet results. The first fiber takes up a smaller amount of the orange disperse dye and dyes to a light orange shade. The second fiber takes up a larger amount of the orange disperse dye and dyes to a dark orange shade. The third fiber takes up the brown basic dye as well as the orange disperse dye and dyes to a brown since the brown complements and masks the orange.

One problem in preparing multicolor carpets of polyester fibers is that the third fiber does not dye properly. Improper dyeing of the third fiber is typically a result of the fiber either not taking up sufficient basic dye, the fiber taking up too much disperse dye, or a combination of the fiber not taking up sufficient basic dye and taking up too much disperse dye. When one of these three things happen the fiber is unsuitable for commercial use because the fiber will not dye to the aesthetically attractive complementary color.

We have now invented a third fiber comprised of a polyetherester modified with a critical range of isophthalic acid. The polyester is comprised of terephthalic acid, 1,4-cyclohexanedimethanol, poly(oxyethylene)-glycol and a known basic dyeable additive. This fiber exhibits a desirable overall balance of properties and unobviously exhibits a combination of high basic dye takeup and low disperse dye takeup when compared to similar fibers not containing isophthalic acid.

Polyester fibers containing a poly(alkylene oxide) and at least one sulphonate group in the form of a metal salt are known in the art and are described in British Pat. No. 1,238,850.

The combination of high basic dye takeup and low disperse dye takeup is thought to be unobvious because of the manner in which a polyester fiber is thought to dye. Although it is thought that a number of steps are involved in the dyeing phenomenon, two of the most important steps are movement of both the disperse and basic dye from the dye bath onto the surface of the fiber and then the diffusion of both the basic and disperse dye from the surface of the fiber into the interior of the fiber. The rate at which a fiber dyes, or its dye takeup, is thought to be controlled by the rate of diffusion of the basic and disperse dye into the interior of the fiber. It would be expected that the introduction of isophthalic acid would increase the diffusion of both the basic and disperse dye by the same amount. Thus, it would be expected that the introduction of isophthalic acid into a poly(1,4-cyclohexylenedimethylene terephthalate) type polyester would increase both the disperse and basic dye takeup by substantially the same amount. Quite unexpectedly, we have found that the introduction of isophthalic acid into the polymer does not result in a similar increase in both the disperse and basic dye takeup, but, quite remarkably, results in an unobvious combination of a high increase in the basic dye takeup and a low increase in the disperse dye takeup.

Aside from the advantage of having a high basic dye takeup and a low disperse dye takeup, another advantage to the fiber of this invention is that the fiber dyes to commercially acceptable shades without a carrier.

Accordingly, it is an object of this invention to provide a basic dyeable polyetherester fiber having a good overall balance of fiber properties.

Another object of this invention is to provide a basic dyeable polyetherester fiber that dyes without a carrier.

Another object of this invention is to provide a basic dyeable polyetherester fiber that exhibits the unobvious combination of high basic dye takeup and low disperse dye takeup.

Broadly this invention can be described as a basic dyeable poly(1,4-cyclohexylenedimethylene terephthalate) type fiber modified with a critical range of 5 to 15 mole percent of isophthalic acid.

More specifically, the textile fiber of this invention can be described as comprised of A. a polyester of
1. a dicarboxylic acid component comprising
   a. from 82 to 94.5 mole percent terephthalic acid,
   b. from 5 to 15 mole percent isophthalic acid, and
   c. from 0.5 to 3 mole percent of a basic dyeable comonomer having the structural formula:

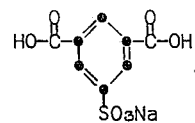

2. a diol component comprised of
   a. 1,4-cyclohexanedimethanol, and
   b. from 6 to 10 weight percent, based on the weight of the polyetherester, poly(oxyethylene)glycol having an average molecular weight in the range of 400 to 4,000, B. from 20-300 weight parts per million, based on the weight of the polyetherester, phosphorus derived from certain phosphorus compounds, and C. based on the weight of the polyetherester, from 1000 to 5000 weight parts per million of a stabilizer effective to reduce oxidative degradation of the polyetherester.

In this invention, the dicarboxylic acid component of the polyester is comprised of terephthalic acid, isophthalic acid and a dicarboxylic acid basic dyeable comonomer. The range of isophthalic acid is from 5 to 15 mole percent and is quite critical. If less than 5 mole percent is used, the unobvious combination of high basic dye takeup and low disperse dye takeup is not achieved. If more than about 15 mole percent is used the overall balance of properties, particularly the mechanical properties, of the carpet fiber tend to be reduced to an unacceptable level. Preferably the range of isophthalic acid is from 9 to 11 mole percent.

In this invention the range of basic dyeable comonomer is from 0.5 to 3 mole percent. If less than 0.5 mole percent of basic dyeable comonomer is used the fiber will not exhibit sufficient basic dye takeup. If more than about 3.0 mole percent are used no additional effect is noted on basic dyeability and the overall balance of properties will tend to be reduced. Preferably the range of basic dyeable comonomer is from 1.5 to 2.5 mole percent.

The range of terephthalic acid is not critical in this invention but is governed by the amount needed to form a polyester with sufficiently high inherent viscosity to form the claimed textile fiber. One way to conveniently determine the amount of terephthalic acid needed is to first select an amount of isophthalic acid needed to achieve the unobvious combination of high basic dye takeup and low disperse dye takeup, then select an amount of basic dyeable comonomer needed to produce a desirably deep basic dyeable shade. Then the amount of terephthalic acid to be used is an amount so that the sum of the terephthalic acid, isophthalic acid and dicarboxylic acid basic -benzenetriyltrimethylene, comonomer is 100 mole percent. For example, if it is desired to practice the invention with 10 mole percent of isophthalic acid and 2 mole percent of basic dyeable comonomer then one could use 88 mole percent of terephthalic acid in conjunction with 110 to 150 mole percent of the diol component so as to form a high molecular weight polymer by elimination of diol thereby producing a polymer with equal moles of dicarboxylic acid component and diol component.

The basic dyeable comonomer useful in this invention is known in the art and is disclosed in U.S. Pat. No. 3,018,272, herein incorporated by reference.

This basic dyeable comonomer corresponds to the formula

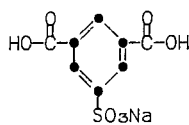

This invention has been described in terms of the dicarboxylic acid components being in the acid form, but the term "dicarboxylic acid", and words of similar import, is intended to include esters of dicarboxylic acids such as dimethyl, diethyl, and diphenyl. The dimethyl ester is preferred.

In this invention the polyetherester is formed from a diol component comprised of 1,4-cyclohexanedimethanol and poly(oxyethylene)glycol. In this invention the amount of poly(oxyethylene)glycol is from 6 to 10 weight percent, preferably from 7 to 9 weight percent, based on the weight of the polyetherester. If less than 6 weight percent poly(oxyethylene)glycol is used the fiber will not dye to deep, commercially acceptable shades without a carrier. If more than about 10 weight percent poly(oxyethylene)glycol is used the overall balance of properties of the fibers will tend to be reduced. The molecular weight of the poly(oxyethylene)glycol is in the range of 400 to 4,000, preferably from 400 to 800, calculated as average molecular weight.

As will be recognized by those skilled in the art, the moles of diol component must be substantially the same as the moles of dicarboxylic acid component in the final polymer or the molecular weight of the polymer will not be high enough to form the claimed textile fiber.

The fiber of this invention contains phosphorus derived from the phosphorus compounds useful in this invention.

In one aspect of this invention, the phosphorus compound can be phosphorous acid, phosphoric acid, pyrophosphoric acid or polyphosphoric acid.

These compounds and methods for their preparation are well known in the art.

In another aspect of this invention, the phosphorus compound corresponds to the formula

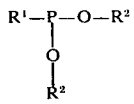

where
R$^1$ is —H, a monovalent alkyl radical having 1–18 carbon atoms, a monovalent aryl or substituted aryl radical having 6–15 carbon atoms, or —O—R where R is the same as R$^1$,
R$^2$ is —H, monovalent alkyl radical having 1–18 carbon atoms, or a monovalent aryl or substituted aryl radical having 6–15 carbon atoms, provided that when R$^2$ is alkyl, at least one of R$^2$ has a chain of at least two unsubstituted methylene groups attached to the oxygen atom attached to phosphorus.

Examples of monovalent alkyl radicals having 1 to 18 carbon atoms include methyl, ethyl, n-propyl, n-butyl, 2,2-dimethylbutyl, 2,2-dimethylhexyl, n-pentyl, n-hexyl, 2-ethylhexyl, n-octyl, 2,2-dimethyloctyl, n-nonyl, n-decyl, dodecyl, 2,2-dimethyldecyl, stearyl, and the like. In this disclosure the term "alkyl" also includes cyclic alkyl, sometimes called alicyclic.

Examples of monovalent aryl or substituted aryl radicals having 6 to 14 carbon atoms include

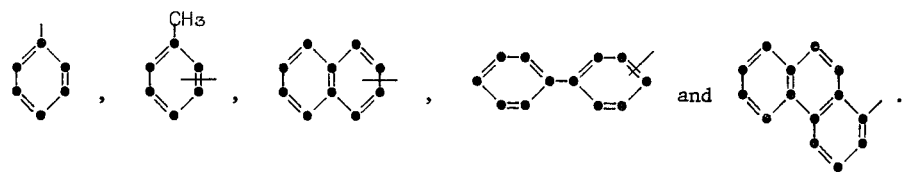

These compounds and methods for their preparation are well known in the art.

In a further aspect of this invention, the phosphorus compound corrresponds to the formula

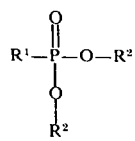

where
R$^1$ and R$^2$ are the same as above.

These compounds and methods for their preparation are well known in the art.

In still a further aspect of this invention, the phosphorus compound can correspond to the formula

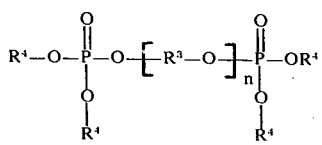

where
R$^4$ is —H, a monovalent alkyl radical haivng 1–18 carbon atoms, or a monovalent aryl or substituted aryl radical having 6–15 carbon atoms,
$n = 1–6$, and
R$^3 = +CH_2\rightarrow_x$ where $x = 2–6$.

Examples of monovalent alkyl radicals having 1 to 18 carbon atoms include methyl, ethyl, n-propyl, n-butyl, isopropyl n-pentyl, n-hexyl, 2-ethylhexyl, n-octyl, n-nonyl, n-decyl, dodecyl, stearyl, and the like.

Examples of monovalent aryl or substituted aryl radicals having 6 to 14 carbon atoms include

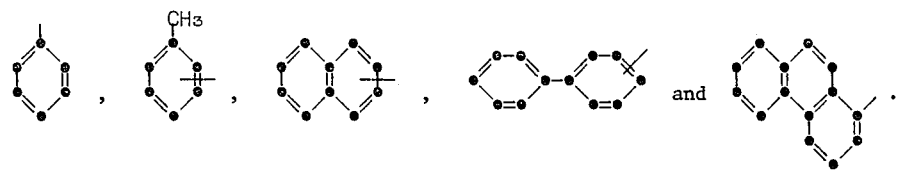

One preferred compound of this type occurs when $n$ is 1 to 3, $x$ is 2 and R$^4$ is a monovalent alkyl radical having 8 carbon atoms, with the proviso that one R$^4$ is always hydrogen. The compound corresponding to this preferred structure is commercially available from the E. I. duPont de Nemours Company and is sold under the trade name "Zonyl A".

In a still further aspect of this invention the phosphorus compound can correspond to the structure

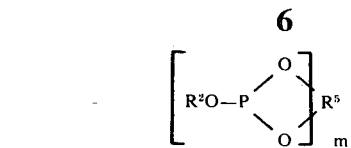

where
R$^2$ is the same as above,
R$^5$ is a divalent or tetravalent alkyl radical having 2–5 carbon atoms,
$m = 1$ or 2.

Examples of divalent alkyl radicals having 2–5 carbon atoms include ethylene, 1,2-propylene, 2,2-dimethyltrimethylene, and the like. An example of a tetravalent alkyl radical having 5 carbon atoms is

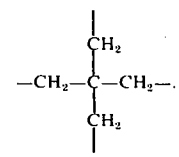

These compounds and methods for the preparation are well known in the art.

In a still further aspect of this invention, the phosphorus compound can correspond to the structure

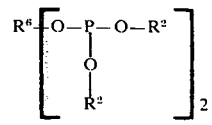

where
R$^2$ is the same as above, 0350
R$^6$ is a divalent alkyl radical having 2–12 carbon atoms or a divalent aryl or substituted aryl radical having 6–15 carbon atoms.

Examples of divalent alkyl radicals having 2–12 carbon atoms include ethylene, propylene, 2,2-dimethyl trimethylene, decamethylene, and the like.

Examples of suitable divalent aryl or substituted aryl radicals having 6 to 15 carbon atoms include

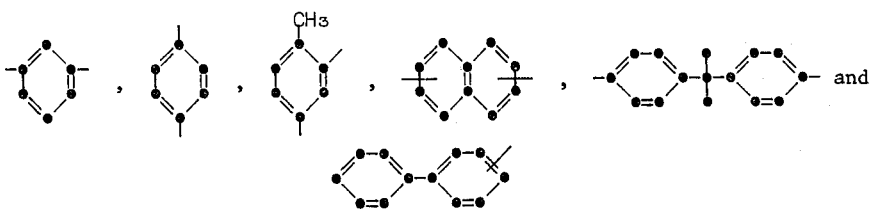

These types of compounds and methods for their preparation are well known in the art.

In a still further aspect of this invention the phosphorus compund can correspond to the structure

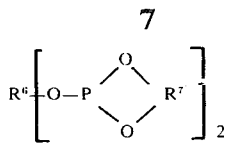

where

R⁶ is the same as above, and

R⁷ is a divalent alkyl radical having 2–5 carbon atoms.

Examples of divalent alkyl radicals having 2–5 carbon atoms are —CH$_2$CH$_2$—, —CH$_2$CH$_2$CH$_2$—, —CH$_2$CH$_2$CH$_2$CH$_2$—,

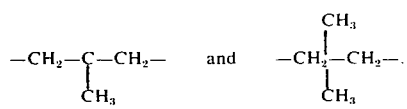

In this invention the phosphorus is disclosed as being "derived from" certain compounds. By the term "derived from", and words of similar import, we mean that the phosphorus compound chemically combines either partially or completely with other materials depending at what stage during the polymerization, spinning or fiber processing it is introduced into the polymer and consequently the phosphorus compound per se does not necessarily exist in the final polyetherester. Specifically, it is thought that a portion of the ester linkages of the phosphorus compound introduced in the polymer esterifies into the polymer chain and is present as monomeric or polymeric phosphite, phosphate or phosphonate esters of the diols or oligomers. In addition, it is thought that other linkages of the phosphorus compound introduced into the polymer chemically combine with metal ions which are present in the polyetherester from various sources, such as from polymerization catalysts, from the manganese ion or from trace impurities.

The phosphorus compounds useful in this invention have been described in terms of phosphorous compounds containing ester and/or -OH acid groups. As will be recognized by those skilled in the art, functionally equivalent amine or alkali metal salts can be used in place of the —OH acid group. Although this invention is described in terms of phosphorus compounds containing ester and/or -OH acid groups, it is to be understood that corresponding alkali metal salts and amine salts are within the scope of the invention provided that at least one ester group is present.

In this invention the amount of phosphorus can range from 20–300 weight parts per million preferably 20–150 weight parts per million, based on the weight of the polyetherester.

In this invention a stabilizer is used to prevent oxidative degradation of the polyetherester. Broadly the stabilizer useful in our invention can be described as a relatively nonvolatile hindered phenolic antioxidant corresponding to the structure

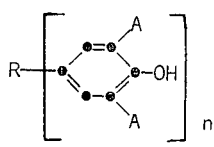

where n is from 1 to 4,

R is a radical selected from the group consisting of
1. neopentanetetrayltetrakis[oxy(3-oxotrimethylene)],
2. phosphinylidynetrioxy,
3. 2,4,6-trimethyl-1,3,5-benzenetriyltrimethylene,
4. alkylene having 1 to 5 carbon atoms,
5. alkyl having 1 to 12 carbon atoms, and
6. 2,4,6-trioxo-1,2,3,4,5,6-hexahydro-s-triazine-1,3,5-triyl)tris(3-oxotrimethylene), and
7. [3-octadecyloxy)-3-oxopropyl].

A is a monovalent radical selected from the group consisting of
1. tertiary alkyl having 4 to 8 carbon atoms,
2. alkyl having 8 to 22 carbon atoms, and
3. secondary alkyl having 12 to 24 carbon atoms.

Examples of alkylene radicals having 1 to 5 carbon atoms include —CH$_2$—, —CH$_2$CH$_2$—, —CH$_2$CH$_2$CH$_2$CH$_2$—.

Examples of alkyl radicals having 1 to 12 carbon atoms include CH$_3$—, C$_2$H$_5$—, C$_3$H$_7$, C$_6$H$_{13}$—, C$_9$H$_{19}$—, and C$_{12}$H$_{25}$—.

Examples of monovalent tertiary alkyl radicals having 4 to 8 carbon atoms include —C(CH$_3$)$_3$, —C(C$_2$H$_5$)(CH$_3$)$_2$,

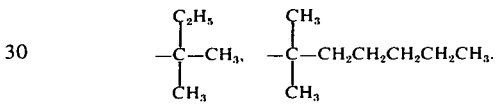

Examples of monovalent alkyl radicals having 8 to 22 carbon atoms include

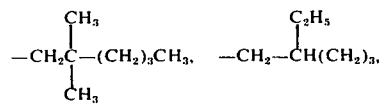

—CH$_2$(CH$_2$)$_6$CH$_3$, —CH$_2$(CH$_2$)$_{10}$CH$_3$, and —C$_{18}$H$_{37}$.

Examples of monovalent secondary alkyl radicals having 12 to 24 carbon atoms include

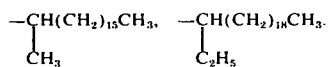

A preferred antioxidant is pentaerythritol tetrakis[3-(3,5-tert-butyl)-4-hydroxyphenyl]propionate which is sold commercially as Irganox 1010 by Geigy Chemical Company and corresponds to the structure

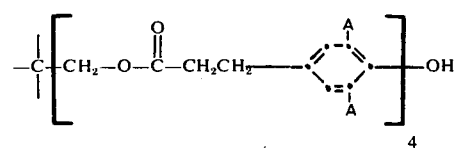

where

A is 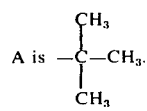

Among the other hindered phenols which are useful in our invention are 4,4'-butlidenebis(6-tert-butyl-m-cresol), 1,3,5-trimethyl-2,4,6-tris(3,5-di-tert-butyl-4-hydroxybenzyl)benzene, tris(3,5-di-tert-butyl)4-hydroxyphenyl phosphate, and dloctadecyl 3,5-di-tert-butyl-4-hydroxybenzyl phosphonate.

In the broader embodiment of this invention 1000 to 5000 weight parts per million stabilizer, based on the weight of the polyetherester, can be used. In a specific embodiment of this invention, from 1000 to 3000 weight parts per million, based on the weight of the polyetherester, can be used.

The fiber of this invention is prepared according to methods well known in the art.

According to one method of practicing this invention a polyester prepolymer is formed by contacting terephthalic acid, isophthalic acid and 1,4-cycohexanedimethanol and poly(oxyethylene)glycol, and a sufficient quantity of the compound from which the phosphorus is derived to provide from 20–300 weight parts per million phosphorus, based on the weight of the polyetherester.

As will be recognized by those skilled in the art, water is eliminated during formation of the oligomeric product, or methanol is eliminated when dimethyl terephthalate is used, and there is formed a hydroxy terminated low molecular polymer having a degree of polymerization of 4 to 8.

As will be understood by those skilled in the art the ester interchange reaction can be conducted in the presence of a suitable catalyst product, such as titanium tetraisopropoxide, acetyl titanium triisopropoxide or an organo metallic tin compound.

The thermodynamic conditions used to form the ester interchange product can vary depending on the particular desires of the practitioner of the invention. Thus, one skilled in the art could select a wide variety of pressure and temperature conditions suitable to form the ester interchange product. One example of thermodynamic conditions that can be used is a pressure in the range of 14 to 50 psi and a temperature of 150° to 300°C. An example of preferred thermodynamic conditions for continuous polymerization is a pressure of 20 to 35 psi and a temperature of 180° to 280°C. Other thermodynamic conditions can be used.

The poly(oxyethylene)glycol can can contacted with the other materials during formation of the polyetherester prepolymer by a variety of conventional methods. In one embodiment, the contact can be accomplished using an in-line mixer in a continuous system. In another embodiment, the contact can be accomplished by charging the poly(oxyethylene)-glycol to a batch reactor along with the other materials. Preferably the contact is accomplished by adding the poly(oxyethylene)glycol at atmospheric or higher than atomospheric pressure before ester interchange has occurred. Although the contact can be accomplished within a broad range of pressures and temperatures, in one particularly desirable embodiment the pressure can range from 15 to 35 psi and the temperature can be from 160° to 280°C.

The process for preparing the textile fiber of this invention has been described in terms of forming a polyetherester prepolymer containing the recited materials "under ester interchange conditions". Although the process of the invention has been described in this manner, the invention is not to be considered limited to forming the polyetherester prepolymer "under ester interchange conditions". For example, a polymeric type product could be formed from terephthalic acid, isophthalic acid and 1,4-cyclohexanedimethanol and then the poly)oxyethylene)glycol could be added to form the polyetherester prepolymer. According to another method, a polymeric type product can be formed from terephthalic acid, isophthalic acid, 1,4-cyclohexanedimethanol and the poly(oxyethylene)-glycol and phosphorus can be added to form the polyetherester prepolymer The polyetherester prepolymer can be formed in other ways.

The next step in practicing this invention involves forming a final polyetherester, having an inherent viscosity of at least 0.4, from the contacted ester interchange product and poly(oxyethylene)glycol. This step, often called polycondensation by those skilled in the art, can be accomplished in conventional equipment well known in the art. The thermodynamic conditions used to form the final polyetherester can vary widely depending on the desires of the practitioner of the invention. According to one manner in which the invention can be practiced, the high molecular weight polyetherester is formed at a pressure within the range of 0.1 to 10 mm. Hg. and a temperature within the range of 280° to 300°C. by the elimination of 1,4-cyclohexanedimethanol. According to a preferred manner of practicing the invention, the pressure is within a range of 0.5 to 3 mm. of Hg. Preferably the inherent viscosity of the final polyetherester is at least 0.65.

According to one method of practicing the invention, a portion of the total amount of phosphorus to be used can be added to form the polyester prepolymer and the remaining phosphorus can be added to the final polyetherester. Although the phosphorus compound can be added to the polyetherester in a variety of conventional ways, one particularly desirable method is to add the phosphorus compound to the final polyetherester as it exits from the reaction vessel using an in line mixer. Other methods can be used, such as coating pellets with the phosphorus compound, to add the phosphorus compounds to the polyetherester.

The next step in practicing the invention involves admixing with the final polyetherester, based on the weight of the polyetherester, from 1000–5000 weight parts per million of the stabilizer effective to prevent oxidative degradation of the polyetherester. The final polyetherester of high molecular weight can be admixed with the stabilizer according to techniques well known in the art, such as application from a volatile solvent onto extruded pellets, mixing the polymer with a small quantity of second polymer containing a relatively large amount of stabilizer or, preferably, coextrusion from the polymerization reactor wherein the final polyetherester is formed.

The next step in practicing the invention involves melt spinning the admixture of the final polyetherester and stabilizer into fibers in accordance with techniques well known in the art. According to one method of practicing the invention melt spinning is conducted at a temperature of about 305°C. and a pressure of about 600 psi.

The next step in practicing this invention involves drafting the fibers according to techniques well known in the art. A draft ratio of 1:2.5–5.0 can be used. If desired, the drafting can be accomplished in two stages in water and steam in accordance with conventional technology.

According to one method of practicing this invention, a portion of the phosphorus can be incorporated into the fiber by contacting the fibers with a sufficient quantity of the compound from which the phosphorus is derived. Although a wide variety of thermodynamic conditions can be used to accomplish the sixth step, a temperature range of 80° to 120°C. is particularly desirable.

Although a wide variety of conventional methods such as wiper bars, rollers, etc., can be used to perform the contacting function, in a preferred embodiment the compound from which phosphorus is derived is introduced into a stuffer box crimper. In this embodiment, an admixture of 50 mole percent of an amine salt of a compound corresponding to the formula

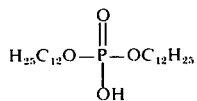

and 50 mole percent of an amine salt of a compound corresponding to the formula

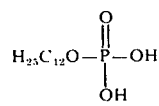

are introduced into a stuffer box crimper.

When a portion of the phosphorus compound is incorporated into the fiber by contacting the fibers with the compound from which the phosphorus is derived, the next step in practicing this invention involves heating the contacted fibers to diffuse the fiber diffusion incorporated phosphorus into the fiber. According to one method of practicing this step, the heating can be accomplished within a temperature range of 160° to 250°C. for 0.05 to 20 minutes and in another method the heating can be accomplished within a temperature range of 180° to 210°C. for 3 to 10 minutes. During the heating step the compound from which the fiber diffusion incorporated phosphorus is derived diffuses from the surface of the fiber so as to uniformly reside within the structure of the fiber.

Although the process for practicing this invention has been described in terms of first accomplishing the step of drafting the spun fibers, and then accomplishing the step of contacting the drafted fibers with the phosphorus, the invention is not to be considered limited to performing these steps in this sequence. Although preferably the drafting step is conducted before the contacting step the important consideration is that both steps are accomplished, not the order in which they are accomplished. For example, the sequence of steps could be accomplishing the step of contacting the fibers with the fiber diffusion incorporated phosphorus and then accomplishing the step of drafting. Regardless of the sequence of these steps the fiber diffusion incorporated phosphorus must be contacted with the fiber before the heating step is accomplished. Preferably the sequence of steps is the drafting step and the contacting step because this sequence is a more commercially attractive method of practicing the invention.

The polyetherester of this invention has an inherent viscosity of at least 0.4, and preferably at least 0.6, measured at 25°C. using 0.5 grams of polymer per 100 ml. of a solvent composed of 60 volumes of phenol and 40 volumes of tetrachloroethane.

In order for the fiber of this invention to exhibit dyeability to true shades and commercially acceptable lightfastness the metal content from catalyst metals should not be excessively high. For example, metals from polycondensation or ester interchange catalysts such as tin, titanium, zinc, etc., should not exceed 200 ppm, based on the weight of the polyetherester, and preferably should not exceed 100 ppm.

The polyetheresters of this invention have an inherent viscosity of at least 0.4, and preferably at least 0.6, measured at 25°C. using 0.5 grams of polymer per 100 ml. of a solvent composed of 60 volumes of phenol and 40 volumes of tetrachloroethane.

An example is presented to illustrate the unobvious combination of high basic dye takeup and low disperse dye takeup of the fiber of the invention containing isophthalic acid when compared with a similar fiber containing no isophthalic acid.

Initially a first fiber is prepared and dyed. This first fiber is similar to the fiber of the invention except that the first fiber contains no isophthalic acid.

The following materials are placed in a 500-ml. reaction flask:

95.15g. (0.49 mole) dimethyl terephthalate
4.35 g. (0.01 mole) dimethyl 5-sodiosulfoisophthalate
12.6 g. (0.021 mole) poly(oxyethylene glycol) 600
90.7 g. (0.629 mole) 1,4-cyclohexanedimethanol
(129.57 g. of a 70% solution in methanol is used)
0.149 g. TiO$_2$
100 ppm Ti as acetyl triisopropyl titanate, 0.50 ml. of a solution made up to 0.03 g. Ti/ml.

The flask is fitted with a nitrogen inlet and an outlet for downward distillation and a metal stirrer. A slow nitrogen sweep is started and the flask is placed in a metal bath controlled at 220°C. After stirring 0.5 hour under these conditions with removal of methanol, the controller setting is increased to 290°C. and after an additional 30 minutes the reaction flask is placed under vacuum. The mixture is stirred 1.5 hours at 290°–296°C. under a vacuum of <0.5 mm. Hg. The reaction mixture is cooled to room temperature and the product polymer is ground to pass a 3-mm. screen. The ground polymer has an inherent viscosity of 0.66.

The polymer is melt spun into fibers at 350°C. at a pressure of 600 psi, the fibers are drafted using a draft ratio of 1:4.3, the drafted fibers are contacted with about 30 weight parts per million fiber diffusion incorporated phosphorus derived from an admixture of equal moles of a compound corresponding to the formula

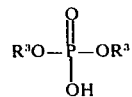

and a compound corresponding to the formula

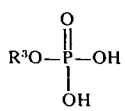

where $R^3$ is a monovalent alkyl radical having 12 carbon atoms. The contacted fibers are heated to diffuse the fiber diffusion incorporated phosphorus within the structure of the fiber.

The properties of the fibers are: denier: 16.5, tenacity: 2.06 g./den., elongation: 33%, and elastic modulus: 28.2g./den. A knit sock is prepared from this fiber and it is dyed without carrier in a dye bath containing 1.5% owf. Eastacryl Blue 2R, a basic dye commercially available from Tennessee Eastman Company, and 1.5% owf. Eastman Polyester Blue BLF, a disperse dye commercially available from Tennessee Eastman Company. The fiber dyes to 50% exhaustion of the basic dye in 110 minutes and 50% exhaustion of the disperse dye in 41.5 minutes.

A second fiber is prepared and dyed. This fiber contains isophthalic acid in accordance with the invention.

The following materials are placed in a 500-ml. reaction flask:

85.36 g. (0.44 mole) dimethyl terephthalate
9.7 g. (0.05 mole) dimethyl isophthalate
4.35 g. (0.01 mol) dimethyl 5-sodiosulfoisophthalate
12.6 g. (0.021 mole) poly(oxyethylene glycol) 600
90.7 g. (0.629 mole) 1,4-cyclohexanedimethanol
(129.57 g. of a 70% solution in methanol is used)
0.149 g. TiO$_2$
100 ppm. Ti as acetyl triiosropryl titanate, 0.50 ml. of a solution made up to 0.03 g. Ti/ml.

The flask is fitted with a nitrogen inlet and an outlet for downward distillation and a metal stirrer. A slow nitrogen sweep is started and the flask is placed in a metal bath controlled at 200°C. After stirring 0.5 hour under these conditions with removal of methanol, the controller setting is increased to 295°C. and after an additional 30 minutes the reaction flask is placed under vacuum. The mixture is stirred 1.5 hours at 295°–296°C. under a vacuum of <0.5 mm. Hg. The reaction mixture is cooled to room temperature and the product polymer is ground to pass a 3-mm. screen. The ground polymer has an inherent viscosity of 0.78.

This polymer is melt spun into fibers, the fibers are drafted, the drafted fibers are conacted with fiber diffusion incorporated phosphorus and the contacted fibers heated in the same manner as previously described for the first fiber containing no isophthalic acid. The properties of the fibers are: denier: 20, tenacity: 2.07 g./den., elongation: 62%, and elastic modulus: 23.5 g/den. A knit sock is prepared from this fiber and is dyed without carrier in a dye bath containing 1.5 % owf. Eastacryl Blue 2R and 1.5% owf. Eastman Polyester Blue BLF. The fiber dyes to 50% exhaustion of the basic dye in 57.5 minutes and 50% exhaustion of the disperse dye in 36 minutes.

The 50% exhaustion dye times for both the first fiber, containing no isophthalic acid, and the second fiber, containing 10 mole percent isophthalic acid, are compared in the below table.

|  | Time to 50% Exhaustion of Basic Dye, Min. | Time to 50% Exhaustion of Disperse Dye, Min. |
|---|---|---|
| Fiber No. 1 - containing no isophthalic acid | 110 | 41.5 |
| Fiber No. 2 - containing 10 mole percent isophthalic acid | 57.5 | 36 |

These data illustrate that when isophthalic acid is incorporated into the fiber the fiber exhibits an unobvious combination of high basic dye takeup and low disperse dye takeup compared to a similar fiber containing no isophthalic acid.

Specifically, it is to be observed that when the fiber contains no isophthalic acid, as the first fiber, the 50% exhaust dyeing time for the basic dye is 110 minutes but when the fiber contains isophthalic acid, as the second fiber, the 50% exhaust dyeing time is 57.5 minutes. Thus, the use of isophthalic acid results in a 47.5 % decrease in the 50% exhaust dyeing time for the basic dye.

In addition, it is also to be observed that when the fiber contains no isophthalic acid, as the first fiber, the 50% exhaust dyeing time is 41.5 minutes for the disperse dye but when the fiber contains isophthalic acid, as the second fiber, the 50% exhaust dyeing time is only 36 minutes for the disperse dye. Thus, the use of isophthalic acid results in a decrease of only 13% in the 50% exhaust dyeing time for the disperse dye.

It would be expected that the presence of isophthalic acid would increase the rate of basic dye takeup substantially the same amount as the rate of disperse dye takeup is increased. As illustrated above, the presence of isophthalic acid does not increase the basic dye takeup by substantially the same amount as the disperse dye takeup, but, quite unexpectedly, results in the fiber having the combination of a high basic dye takeup and a low disperse dye takeup.

When other qunatities of isophthalic acid are used substantially the same results obtain.

The invention has been described in detail with particular reference to preferred embodiments thereof, but it will be understood that variations and modifications can be effected within the spirit and scope of the invention.

We claim:
1. A basic dyeable textile fiber comprised of
   A. a polyetherester of
      1. a dicarboxylic acid component comprising
         a. from 82 to 94.5 mole percent terephthalic acid,
         b. from 5 to 15 mole percent isophthalic acid, and
         c. from 0.5 to 3 mole percent of a basic dyeable comonomer having the structural formula:

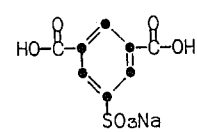

2. a diol component comprised of
      a. 1,4-cyclohexanedimethanol, and b. from 6 to 10 weight percent, based on the weight of the polyetherester, poly(oxyethylene)-glycol having an average molecular weight in the range of 400 to 4,000, B. from 20–300 weight parts per million, based on the weight of the polyetherester, phosphorus derived from
1. phosphorous acid,
2. phosphoric acid,
3. pyrophosphoric acid,
4. polyphosphoric acid, or a compound corresponding to the formula
5.

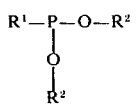

where
R¹ is —H, a monovalent alkyl radical having 1–18 carbon atoms, a monovalent aryl or substituted aryl radical having 6–15 carbon atoms, or —O—R where R is the same as R¹,
R² is —H, monovalent alkyl radical having 1–18 carbon atoms, or a monovalent aryl or substituted aryl radical having 6–15 carbon atoms, provided that when R² is alkyl, at least one of R² has a chain of at least two unsubstituted methylene groups attached to the oxygen atom attached to phosphorus,

6.

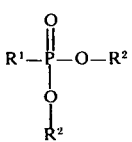

where
R¹ and R² are the same as above,

7.

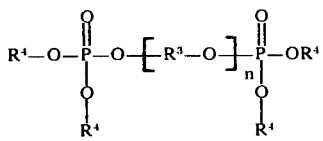

where
R⁴ is —H, a monovalent alkyl radical having 1–18 carbon atoms, or a monovalent aryl or substituted aryl radical having 6–15 carbon atoms,
$n = 1-6$,
R³ =—(CH₂)ₓ— where $x = 2-6$,

8.

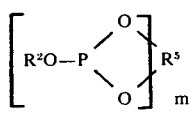

where
R² is the same as above,

R⁵ is a divalent or tetravalent alkyl radical having 2–5 carbon atoms,
$m = 1$ or $2$,

9.

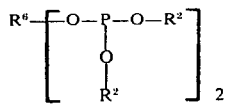

where
R² is the same as above,
R⁶ is a divalent alkyl radical having 2–12 carbon atoms or a divalent aryl or substituted aryl radical having 6–15 carbon atoms,

10.

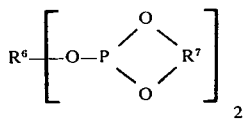

where
R⁶ is the same as above,
R⁷ is a divalent alkyl radical having 2–5 carbon atoms, and C. based on the weight of the polyetherester, from 1000 to 5000 weight parts per million of a stabilizer effective to reduce oxidative degradation of the polyetherester corresponding to the structure

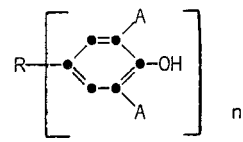

$n$ is from 1 to 4,
R is a radical selected from the group consisting of
1. neopentanetetrayltetrakis [oxy(3-oxotrimethylene)],
2. phosphinylidynetrioxy,
3. 2,4,6-trimethyl-1,3,5-benzenetrlyltrimethylene,
4. alkylene having 1 to 5 carbon atoms,
5. alkyl having 1 to 12 carbon atoms,
6. 2,4,6-trioxo-1,2,3,4,5,6-hexahydro-s-triazine-1,3,5-triyl)tris(3-oxotrimethylene), and
7. [3-oxtadecyloxy)-3-oxopropyl], and A is a monovalent radical selected from the group consisting of
1. tertiary alkyl having 4 to 8 carbon atoms,
2. alkyl having 8 to 22 carbon atoms, and
3. secondary alkyl having 12 to 24 carbon atoms.

2. A basic dyeable textile fiber comprised of
A. a polyetherester of
1. a dicarboxylic acid component comprising
a. 86.5 to 89.5 mole percent of dimethyl terephthalate,
b. 9 to 11 mole percent of dimethyl isophthalate,
c. 1.5 to 2.5 mole percent of a basic dyeable comonomer having the structure

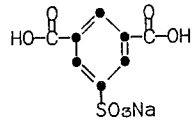

2. a diol component comprised of
   a. 1,4-cyclohexanedimethanol, and
   b. from 7 to 9 weight percent, based on the polyetherester, of poly(oxyethylene)glycol having an average molecular weight in the range of 400 to 800,
B. from 20–300 weight parts per million, based on the weight of the polyetherester, phosphorus derived from
   1. phosphorous acid,
   2. phosphoric acid,
   3. pyrophosphoric acid,
   4. polyphosphoric acid, or a compound corresponding to the formula
   5.

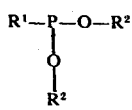

where
   $R^1$ is —H, a monovalent alkyl radical having 1–18 carbon atoms, a monovalent aryl or substituted aryl radical having 6–15 carbon atoms, or —O—R where R is the same as $R^1$,
   $R^2$ is —H, monovalent alkyl radical having 1–18 carbon atoms, or a monovalent aryl or substituted aryl radical having 6–15 carbon atoms, provided that when $R^2$ is alkyl, at least one of $R^2$ has a chain of at least two unsubstituted methylene groups attached to the oxygen atom attached to phosphorus,
6.

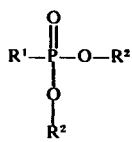

where
   $R^1$ and $R^2$ are the same as above,
7.

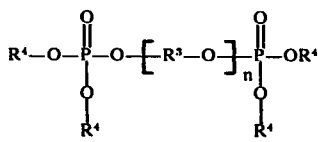

where
   $R^4$ is —H, a monovalent alkyl radical having 1–18 carbon atoms, or a monovalent aryl or substituted aryl radical having 6–15 carbon atoms,
   $n = 1–6$,
   $R^3 = +CH_2\rightarrow_x$ where $x = 2–6$,
8.

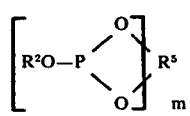

where
   $R^2$ is the same as above,
   $R^5$ is a divalent or tetravalent alkyl radical having 2–5 carbon atoms,
   $m = 1$ or 2,
9.

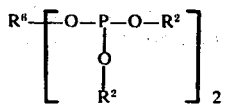

where
   $R^2$ is the same as above,
   $R^6$ is a divalent alkyl radical having 2–12 carbon atoms or a divalent aryl or substituted aryl radical having 6–15 carbon atoms,
10.

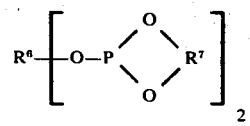

where
   $R^6$ is the same as above,
   $R^7$ is a divalent alkyl radical having 2–5 carbon atoms, and
C. based on the weight of the polyetherester, from 1000 to 3000 weight parts per million pentaerythritol tetrakis[3-(3,5-di-tert-butyl-4-hydroxyphenyl)-propionate] having the structure

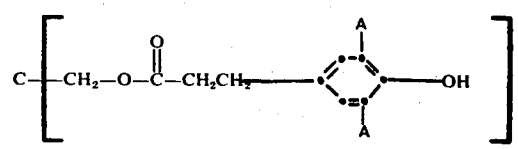

where

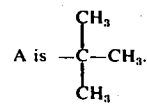

3. A basic dyeable textile fiber comprised of
A. a polyetherester of
   1. a dicarboxylic acid component comprising
      a. 86.5 to 89.5 mole percent of dimethyl terephthalate,
      b. 9 to 11 mole percent of dimethyl isophthalate,
      c. 1.5 to 2.5 mole percent of a basic dyeable comonomer having the structure

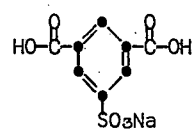

and 2. a diol component comprisied of
   a. 1,4-cyclohexanedimethanol, and
   b. from 7 to 9 weight percent, based on the polyetherester, of poly)oxyethylene glycol having an average molecular weight in the range of 400 to 800,
B. from 20–300 weight parts per million, based on the weight of the polyetherester, phosphorus derived from a compound corresponding to the formula

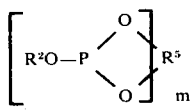

where
   $R^2$ is a monovalent alkyl radical having 1–18 carbon atoms,
   $R^5$ is a tetravalent alkyl radical having 5 carbon atoms, and $m = 2$, and C. based on the weight of the polyetherester, from 1000 to 3000 weight parts per million pentaerythritol tetrakis [3-(3,5-di-tert-butyl-4-hydroxyphenyl)-propionate] having the structure

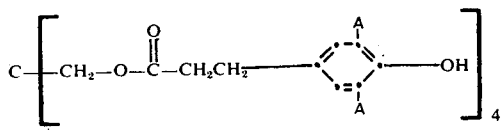

where

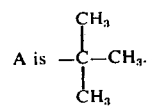

* * * * *